Sept. 22, 1959 R. E. SMITH ET AL 2,905,194
COMBINATION AIR HOSE AND TOOL BALANCER
Filed March 28, 1955 2 Sheets-Sheet 1

INVENTORS
WILLIAM M. BOOTH
FRANK W. HANNUM
RALPH E. SMITH
BY
ATTORNEY

Sept. 22, 1959   R. E. SMITH ET AL   2,905,194
COMBINATION AIR HOSE AND TOOL BALANCER
Filed March 28, 1955   2 Sheets-Sheet 2

INVENTORS
WILLIAM M. BOOTH
FRANK W. HANNUM
RALPH E. SMITH
BY
ATTORNEY

United States Patent Office 2,905,194
Patented Sept. 22, 1959

2,905,194

COMBINATION AIR HOSE AND TOOL BALANCER

Ralph E. Smith, Spring Lake, Frank W. Hannum, Muskegon Heights, and William M. Booth, Spring Lake, Mich., assignors to Gardner-Denver Company, Quincy, Ill., a corporation of Delaware Application March 28, 1955, Serial No. 497,225

7 Claims. (Cl. 137—561)

This invention relates to pneumatic tools and more particularly to a combination air hose and balancer for pneumatic tools, designed to balance a tool at a pre-determined height above a work area while still permitting the tool to be pulled down to the work by the operator.

In many operations, one of the major time consuming steps is that of the operator's reaching for and returning a tool to its storage space at the beginning and the end of each working cycle. Sometimes this consumes as much time as the operation itself. Tools, particularly of the pneumatic type, must be carefully stored because the attached air hose has a tendency to pull them off a bench or shelf.

Sometimes mechanical balancers have been provided for supporting the tool. These balancers frequently are clumsy structures. Further, they do not solve the problem of retracting the air hose from the operator's work area.

This invention provides an arrangement which is substantially less expensive than the mechanical balances and which accomplishes its purpose by a single component serving as both the air hose and the balancer.

This invention also relieves the operator of lifting the tool in order to remove it from the working area. It accomplishes this without requiring the operator to use substantial force to pull the tool to the work. This latter is important. If the balancer exerts substantial resistance to the movement of the tool to the work, inaccuracy in the work produced may result because of interference with the operator's manipulation of the tool.

These and other objects and purposes of this invention will be readily seen by those acquainted with the design and use of pneumatic tools upon reading the following specification and the accompanying drawings.

In executing the objects and purposes of this invention, we have provided an air hose which has been formed into a helix. In the process of so forming the hose, it is given elastic memory so that it will act as a tension spring. Our invention contemplates the use of such a hose both with and without a reinforcement. When it is reinforced, a tempered spring wire, formed into a helix conforming to that of the hose, is threaded into the hose from one end. This spring extends the entire length of the hose. This wire spring reinforcement acts in cooperation with the hose to support the tool.

Referring specifically to the drawings, the numeral 1 indicates a tubular hose. This hose may be of any suitable material capable of being given a resilient, elastic memory either in the manner in which the hose is constructed or in the orientation of the material when the hose is initially formed. As an example of one particular material suitable for this purpose, the hose may be made of polyvinyl chloride. The diameter of the hose is large enough to permit free flow of the quantity of air necessary to operate the tool, even with the hereinafter described wire reinforcement installed in the air passage of the hose. The wall thickness of the hose must be sufficient to withstand, with safety, the normal operating pressures imposed upon the hose. These operating pressures may vary through a rather wide range but a normal operating pressure is approximately 90 pounds per square inch.

Figure 5:
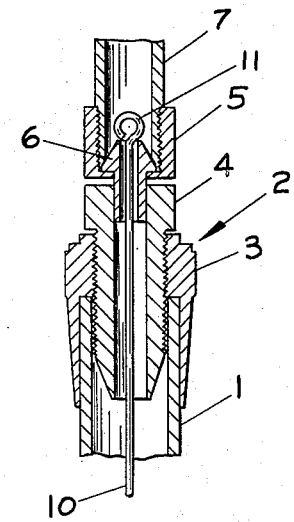
Fig. 5 is an enlarged, fragmentary, central sectional view of the end of our combination balancer and air hose, of the type illustrated in Figs. 1, 3 and 4, showing the air hose attached to a supply conduit.

Each end of the hose is equipped with a coupling 2. The couplings 2 are identical, having an external terminal fitting 3, the apron of which extends over the ouside of the hose 1 (Fig. 5). The external terminal fitting 3 is internally threaded for reception of the threaded, internal terminal fitting 4 which passes through the external terminal fitting and clamps the hose tightly against the apron of the external terminal fitting. The coupling includes an internally threaded collar 5 rotatably seated about the headed nipple 6. One end of the nipple 6 is press-fitted into the internal terminal fitting 4. The collar 5 is designed to threadedly engage a suitable air conduit 7. Further description of the couplings is not believed necessary inasmuch as they are conventional equipment. Couplings of various commercially available designs may be used with this invention.

Extending through the center of the hose is a reinforcement spring 10. The spring 10 is preferably of a high carbon material tempered to high resiliency. Various materials may be used for the spring 10 but preferably it should be of high strength material which, after tempering, is not subject to operational failure due to fatigue.

It is possible to insert the spring 10 in the hose before either have been shaped. The hose is then heated as by immersion in hot water until it is soft enough to be reshaped. The hose and wire are then wound upon a mandrel to give them a helical shape. It is considered a preferable practice, however, to form the hose and the spring 10 in separate operations and to assemble the spring to the hose after forming. In this manner, much greater strength can be built into the unit. It permits the spring, after coiling, to be tempered. Such a spring is stronger and has substantially greater resistance to fatigue.

Suitable automatic machinery may be provided both to shape the spring and to install it in the hose. As the spring is threaded into the hose, it should, preferably, have one end bent over or in some other way blunted to prevent gouging of the interior wall of the hose during installation.

Figure 3:
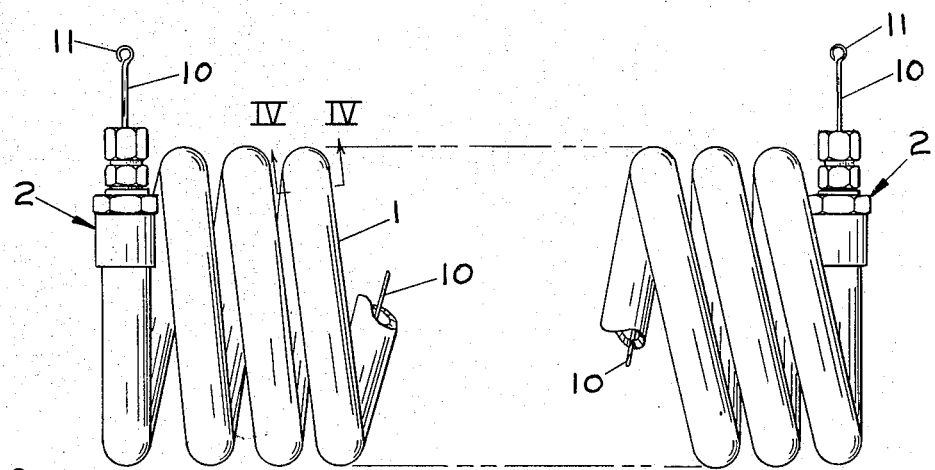
Fig. 3 is a fragmentary, enlarged, side elevation view of a combination air hose and balancer constructed according to our invention of the type illustrated in Fig. 1.
Figure 4:
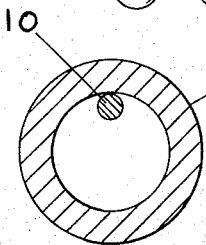
Fig. 4 is a sectional view taken along the plane IV—IV of Fig. 3.

The ends of the spring 10 project substantially beyond both ends of the hose when the hose is in its relaxed position as illustrated in Fig. 3. A loop 11 is provided on each end of the spring. The loops 11 are large enough to prevent the end of the spring being withdrawn into the hose through the nipple 6. This is necessary because the length of the hose with relation to the spring changes when the hose is attached and the weight of a tool is applied. If the ends of the spring 10 are not restrained from withdrawing into the hose, the alternate extension and retraction of the hose incident to its use as a balancer will cause these ends to rub against the interior wall of the hose, rapidly resulting in operational failure.

Further, the positive anchoring of the ends of the spring appreciably increases the balancer's resistance to elongation, since the spring must be extended against the spring's resilient resistance rather than by having its ends move back and forth within the hose.

Figure 1:
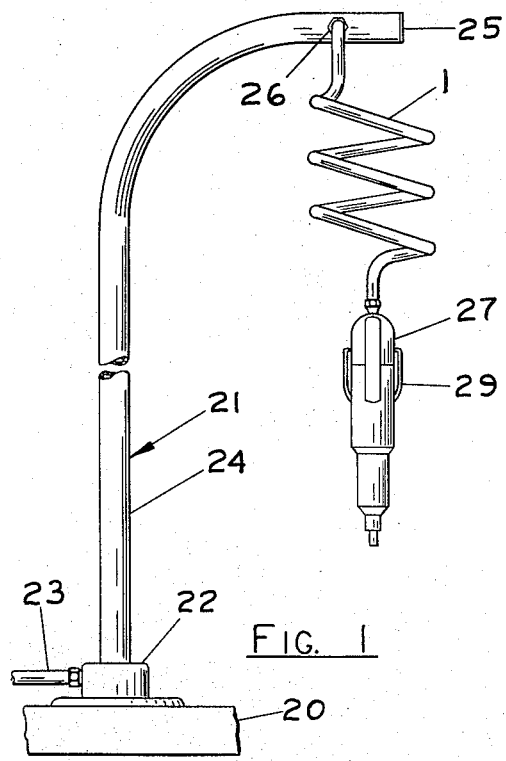
Fig. 1 is a side elevation view of a tool standard and of a combination air hose and tool balancer.

The application of the balancer is illustrated in Fig. 1. In this figure, the numeral 20 refers to a fragmentary showing of a work bench on which is mounted a standard 21. The standard 21 consits of a base 22 having an air intake port to which is coupled an air supply line 23. The base supports a tube 24, the upper portion of which is bent to extend over the work area of the bench. The base 22 closes the lower end of the tube 24 while a cap 25 closes the tube's upper end.

Near the upper end of the tube 24, an outlet port 26 is provided to which is coupled the end of the combination air hose and balancer 1. The outlet port 26 may be located in any suitable position such as on the bottom or, as shown, on the side of the standard 21. If the outlet port is on the side, the balancer hose is formed with an end section at a right angle to adapt it to coupling to the side port.

Mounted on the lower end of the balancer hose 1 is the tool 27. It will be seen from Fig. 1 that the tool is entirely supported by the hose 1. The weight of the tool partially extends the hose. The strength of the balancer hose is such that the tool is normally suspended a short distance above the work. When the operator wishes to use the tool, he merely grasps it and pulls it down to the work against the resistance of the balancer hose 1. The balancer hose 1 is so designed that the amount of force required to draw the tool down to the work is as little as possible. Thus, the operator will experience little resistance to manipulation of the tool. This is important to permit the operator to perform accurate work. When the operator has completed the operation, he releases the tool and the balancer hose automatically pulls it up to its retracted position.

In the installation illustrated in Fig. 1, the balancer hose may consist simply of a helically formed hose 1 or it may consist of a combination of the hose and an internal spring 10. If the tool is small and light weight, the hose alone may be sufficient to support it. Where, however, the tool is larger and thus requires greater support, the combined supporting strength of the hose and the spring may well be necessary to provide adequate support. One of the particular advantages of the type of structure illustrated in Fig. 1 is that only a small degree of effort is necessary to initiate the downward movement of the tool. Because of the diameter of the helix into which the hose is coiled and of any spring 10 which may be installed within it, the resistance of the hose balancer to the downward movement of the tool will not appreciably increase in the short travel required to draw the tool to the work.

Figure 2:
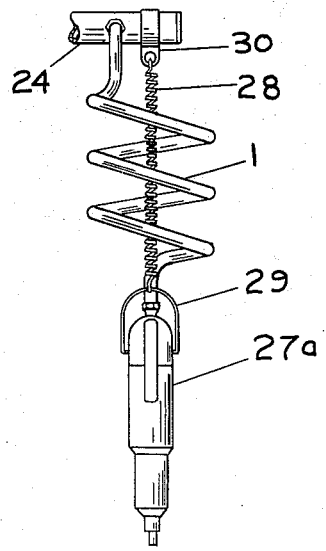
Fig. 2 is a fragmentary, side elevation view of a modified form of our invention.

Fig. 2 illustrates a modified form of this invention which may be necessary when the larger and heavier tools are employed. In this case, the lifting force of the balancer hose 1 is supplemented by a long tension spring 28, secured on one end to a bail 29 on the tool 27a and on its upper end to the hanger strap 30 encircling the tube 24. This is not as desirable an arrangement as that illustrated in Fig. 1 because the tension spring 28 will rapidly increase its resistance to elongation as it is extended in the downward movement of the tool 27a. Further, the spring 28 provides a means which will readily collect dust and dirt and is not adapted to easy cleaning. The spring 28 is to be considered more as an auxiliary means of supporting the tool where the combined supporting strengths of the hose 1 and of the spring 10 within the hose are insufficient to support the weight of the particular tool.

While it has been found that a permanent helical shape may be imparted to hoses made of certain materials such as polyvinyl chloride by taking straight lengths of the hose and heating it sufficiently to soften it and then wrapping it around a mandrel, hoses so formed do not have the same degree of resiliency as those to which the helical shape was imparted when the hose was initially made.

Figure 6:
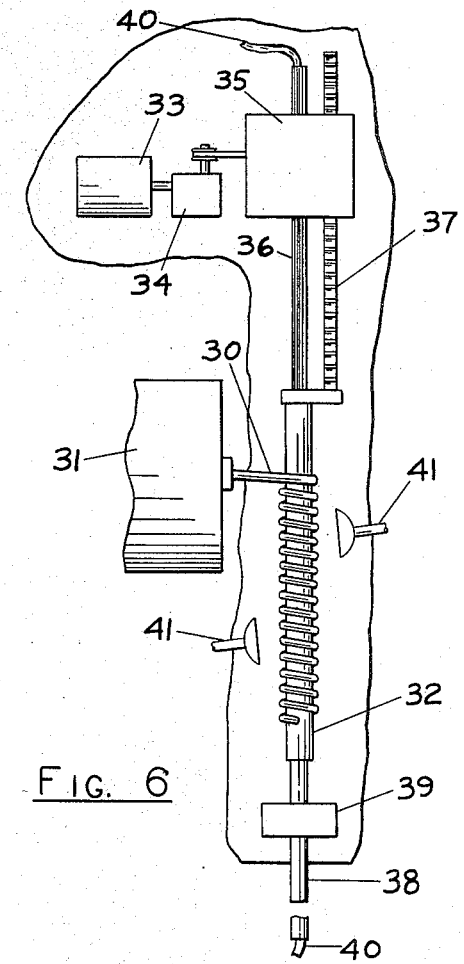
Fig. 6 is a schematic plan view of a machine for forming the air hose for our invention.
Figure 7:
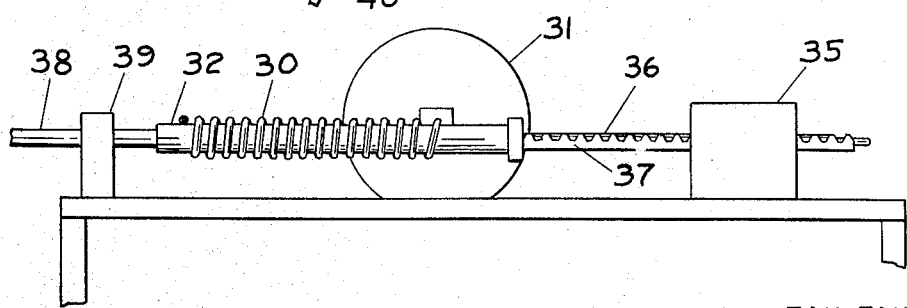
Fig. 7 is a front elevation, schematic view of the machine appearing in Fig. 6.

Accordingly, it is preferable to shape the hose into a helix of the desired diameter when it is initially formed. A machine for accomplishing this is illustrated in Figs. 6 and 7. The hose 30 is extruded as a tube by the machine 31. The machine 31 is equipped with the proper floating die to form the tube and with suitable means to provide air pressure within the hose to prevent it from collapsing before it is cured. After the hose has been extruded and before it is cured, it is wrapped about a rotating mandrel 32. The mandrel 32 is also moved axially so that the hose is not only wrapped about the mandrel but progresses along the mandrel to form a helix.

The mandrel is driven by a prime mover 33 through a speed reducer 34 which in turn is designed to operate the mandrel drive unit 35. One end 36 of the mandrel is splined. The splining on the end 36 permits the mandrel to be rotated by the drive unit 35 and yet moved axially by suitable gearing engaging the rack 37. The rack 37 is merely illustrative of one of many ways in which the mandrel may be caused to move axially. The mandrel's other end 38 is supported by a journal assembly 39 through which it is designed to slide as it rotates.

A coolant is passed through the mandrel by means of an inlet and outlet port 40, one at each end. To accelerate the setting of the plastic hose, suitable discharge heads 41 may be provided to direct a stream of coolant on the hose 30. These are not shown in Fig. 7 and their particular form and construction is not described in detail since they are conventional. The use of the axially traveling and rotating mandrel in cooperation with the extruder 31 is merely one way in which a permanent helical shape may be given to the hose as it is initially formed.

By using the method illustrated in Figs. 6 and 7, the hose is given its helical form as it is initially fabricated. When this is done, the hose has much greater resistance to coil separation such as occurs when the tool is pulled down. The hose, after removal from the mandrel, can be cut into the desired lengths and then placed in a machine adapted to install the spring 10. This spring will have been pre-formed into the proper helical shape and tempered to give it maximum resistance to coil separation. The spring is assembled to the hose by turning it into the hose. The couplings are then secured to the hose. The ends of the spring 10 are then bent to form the loops 11. It will be recognized that where a right angle bend is to be made in the end of the hose, such as is illustrated in Figs. 1 and 2, this may be done by softening the hose after it has been cut to length and the spring installed. In this case, the fact that a hose that has been formed by re-heating does not develop the same resilient, elastic memory as it does when it is first formed is not material since the right angle bend is not intended to provide resistance to bending but rather to make it possible to conveniently join the hose to the standard.

It will be recognized that various other arrangements may be used for imparting a helical shape to the hose. It will also be recognized that various other arrangements can be provided for increasing the resilient resistance of the hose to separation of its coils such as the use of the spring 10. Each of these modifications is to be considered as included in the hereinafter appended claims unless these claims, by their language, expressly state otherwise.

We claim:

1. The combination of an air hose hanger and a pneumatic tool, comprising: a flexible tubular air conduit, a pneumatic tool connected to one end of said conduit and suspended thereby, the connection between said pneumatic tool and said conduit providing for communication between said conduit and said tool, the other end of said conduit being connected to a fixed support and adapted to communicate with an air pressure supply; said conduit having a closely coiled helical shape and being of an elastic material having a pre-shaped elastic memory of sufficient resistance to separation of said coils to lift said tool.

2. The combination of an air hose hanger and a pneumatic tool, comprising: a flexible tubular air conduit, a pneumatic tool connected to one end of said conduit and suspended thereby, the connection between said pneumatic tool and said conduit providing for communication between said conduit and said tool, the other end of said conduit being connected to a fixed support and adapted to communicate with an air pressure supply; said conduit having a closely coiled helical shape and being of an elastic material having a pre-shaped elastic memory; a tension spring secured to each end of said conduit and extending from one end of said conduit to the other; the resistance of said coils to separation and the resistance of said spring to elongation in combination being sufficient to lift and support said tool.

3. The combination of an air hose hanger and a pneumatic tool, comprising: a tubular conduit of elastic material, a pneumatic tool connected to one end of said conduit and suspended thereby, the connection between said pneumatic tool and said conduit providing for communication between said conduit and said tool, the other end of said conduit being connected to a fixed support and adapted to communicate with an air pressure supply, said conduit having a closely coiled helical shape; a spring element seated within and extending throughout the length of said conduit; said spring having the same helical shape as said conduit; resistance of said spring to separation of its coils being sufficient to lift and support said tool.

4. The combination of an air hose hanger and a pneumatic tool, comprising: a tubular conduit of elastic material, a pneumatic tool connected to one end of said conduit and suspended thereby, the connection between said pneumatic tool and said conduit providing for communication between said conduit and said tool, the other end of said conduit being connected to a fixed support and adapted to communicate with an air pressure supply, said conduit having a closely coiled helical shape; a coupling member on each end of said hose; a spring element seated within and extending throughout the length of said conduit; the ends of said spring projecting beyond the ends of said conduit when said conduit is retracted; a loop on each end of said spring adapted to engage said coupling member when said conduit is extended; said spring having the same helical shape as said conduit; the resistance of said spring to separation of its coils being sufficient to lift and support said tool.

5. In a support for a pneumatic tool, the combination comprising: a standard; means for introducing air under pressure to said standard; a flexible tubular hose and means connecting one end of said hose to said standard in depending relationship thereto, said hose being adapted to receive air under pressure from said standard; a pneumatic tool and means for connecting the other end of said hose to said tool, said tool being suspended by said hose, the connection between said tool and said hose providing for communication between said hose and said tool; said hose having a closely coiled helical shape and being of an elastic material having a pre-shaped elastic memory of sufficient resistance to separation of said coils to lift said tool.

6. In a support for a pneumatic tool, the combination comprising: a standard; means for introducing air under pressure to said standard; a flexible tubular hose and means connecting one end of said hose to said standard in depending relationship thereto, said hose being adapted to receive air under pressure from said standard; a pneumatic tool and means for connecting the other end of said hose to said tool, said tool being suspended by said hose, the connection between said tool and said hose providing for communication between said hose and said tool; said hose having a closely coiled helical shape and being of an elastic material having a pre-shaped elastic memory; a tension spring secured at one of its ends to said standard and on the other of its ends to said tool; said tension spring being in the area surrounded by the coils of said hose; the combined resistance to separation of the coils of said hose and of said tension spring being sufficient to lift and support said tool.

7. In a support for a pneumatic tool, the combination comprising: a standard; means for introducing air under pressure to said standard; a flexible tubular hose and means connecting one end of said hose to said standard in depending relationship thereto, said hose being adapted to receive air under pressure from said standard; a pneumatic tool and means for connecting the other end of said hose to said tool, said tool being suspended by said hose, the connection between said tool and said hose providing for communication between said hose and said tool; said hose having a closely coiled helical shape and being of an elastic material having a pre-shaped elastic memory; a spring element seated within and extending throughout the length of said hose; said spring having the same helical shape as said hose; the combined resistance to separation of the coils of said hose and of said spring element being sufficient to lift and support said tool.

References Cited in the file of this patent

UNITED STATES PATENTS

| | | |
|---|---|---|
| 865,355 | Callman | Sept. 10, 1907 |
| 1,360,559 | Monahan | Nov. 30, 1920 |
| 1,730,945 | Poole | Oct. 8, 1929 |
| 1,831,342 | Buskard | Nov. 10, 1931 |
| 1,944,243 | Kegl | Jan. 23, 1934 |
| 2,173,096 | Campbell | Sept. 19, 1939 |
| 2,250,227 | Kiel | July 22, 1941 |
| 2,413,715 | Kemp | Jan. 7, 1947 |
| 2,452,432 | Collins | Oct. 26, 1948 |
| 2,471,793 | Stull | May 31, 1949 |
| 2,509,120 | Warren | May 23, 1950 |
| 2,544,119 | Wolfe | Mar. 6, 1951 |
| 2,544,120 | Wolfe | Mar. 6, 1951 |
| 2,544,121 | Wolfe | Mar. 6, 1951 |
| 2,630,036 | Brown | Mar. 3, 1953 |
| 2,640,502 | Powers | June 2, 1953 |

FOREIGN PATENTS

| | | |
|---|---|---|
| 447,816 | Great Britain | May 26, 1936 |